United States Patent
Heiberg

(10) Patent No.: US 6,354,163 B1
(45) Date of Patent: Mar. 12, 2002

(54) MITIGATING GIMBAL INDUCED DISTURBANCES IN CMG ARRAYS

(75) Inventor: Christopher J. Heiberg, Peoria, AZ (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 09/572,468

(22) Filed: May 17, 2000

(51) Int. Cl.[7] ............................................. G01C 19/40
(52) U.S. Cl. ......................... 74/5.47; 74/5.4; 74/5.7
(58) Field of Search ....................... 74/5.4, 5.5, 5.41, 74/5.47, 5.7; 244/3.2, 165

(56) References Cited

U.S. PATENT DOCUMENTS 3,727,466 A * 4/1973 Kraus et al. ............ 74/5.7 X
3,762,226 A * 10/1973 Davis et al. ................. 74/5.4
4,723,735 A * 2/1988 Eisenhaure et al. ......... 244/165
5,820,078 A * 10/1998 Harrell ........................ 244/165
6,241,194 B1 * 6/2001 Heiberg ....................... 244/165

FOREIGN PATENT DOCUMENTS

JP 0102512 * 5/1986 ............... 74/5.4
JP 0268218 * 11/1990 ............... 7/5.47

* cited by examiner

Primary Examiner—Charles A Marmor
Assistant Examiner—Ha Ho
(74) Attorney, Agent, or Firm—Robert E. Greenstein

(57) ABSTRACT

In a CMG array used to change the attitude of a satellite, noise in the motion of the inner gimbal as it is moved is detected and the speed of the CMG rotors is changed to reduce the noise.

5 Claims, 2 Drawing Sheets

MITIGATING GIMBAL INDUCED DISTURBANCES IN CMG ARRAYS

TECHNICAL FIELD

This invention relates to CMG (Control Momentum Gyros), in particular, mitigating gimbal induced disturbances in CMG arrays.

BACKGROUND

CMGs are commonly used for attitude control in satellites and other spacecraft. A CMG 10 in FIG. 1 on a spacecraft 12 includes an inner gimbal assembly (IGA) 14 and a gimbal torque actuator (GTA) or motor 16 which rotates the IGA. The IGA is an assembly that is free to rotate in one or more axes 17 and stores angular momentum in its rotating inertial mass (rotor) 18, rotated at a constant speed by a rotor spin motor (RSM) 20. Output torque to rotate the spacecraft around on axis is obtained from the CMG by rotating the IGA 14. In practice, several CMGs are aligned along different axis so that the satellite can be oriented spherically.

Output torque on axis 22 from the CMG is the result of the mathematical cross product of the gimbal precession rate vector and the angular momentum vector of the IGA. The output torque is in a plane formed perpendicular to each CMG gimbal axis. Spacecraft attitude control is achieved through the coordinated actuation of a plurality of CMGs in a CMG array. This is a well understood mechanical process that has been employed in spacecraft control for some time. As stated, the rotational torque applied to the satellite from the CMG is a cross product of the IGA rate and stored angular momentum of the rotor 16. An IGA rate can be used to produce high output torque by storing high angular momentum in the IGA rotor. This process is often referred to as torque multiplication because a small input torque to the IGA (input axis in FIG. 1) is multiplied by the stored angular momentum (spin axis) to create a high output torque (output axis).

A problem in the practical application of CMG arrays is noise disturbances in the IGA actuation, which also multiplied/amplified and transmitted to satellite motion, producing less than smooth satellite movement. These disturbances are undesirable in the control of precision pointing spacecraft. The most pervasive gimbal disturbances are those associated with the gimbal rate sensor 24, which is used to feed back IGA motion in a closed loop IGA control that controls the IGA motor speed. Noise in sensors 24 errors can not be easily compensated using conventional control techniques.

Another related device is a reaction wheel assembly (RWA), in which the rotor speed is changed to produce rotational torque on the satellite to change its attitude. But the rotors of the RWA array typically are not mounted on gimbals, so their orientations with respect to the spacecraft coordinates do not change like the gimbals of a CMG.

SUMMARY

An object of the invention is to mitigate the effect of disturbances and noise in IGA motion in a CMG array.

According to the invention, to mitigate or reduce the effect of disturbances or noise, such as noise from IGA motion, the IGA rotor is operated like an RWA as a function of the disturbance.

According to the invention, the nature of the IGA disturbance is sensed or understood and processed by a signal processor in the CMG system to slightly change the rotor speed to offset the effect of the disturbance. This operation is performed at the array level in a CMG array (CMGA) in an attitude control to mitigate noise in all the CMGs, i.e. all the rotational axis.

A feature of the invention is that is can be employed easily in current CMG controls.

Other objects, benefits and features will be apparent to one of ordinary skill in the art from the following drawing and description.

DESCRIPTION

Figure 1:
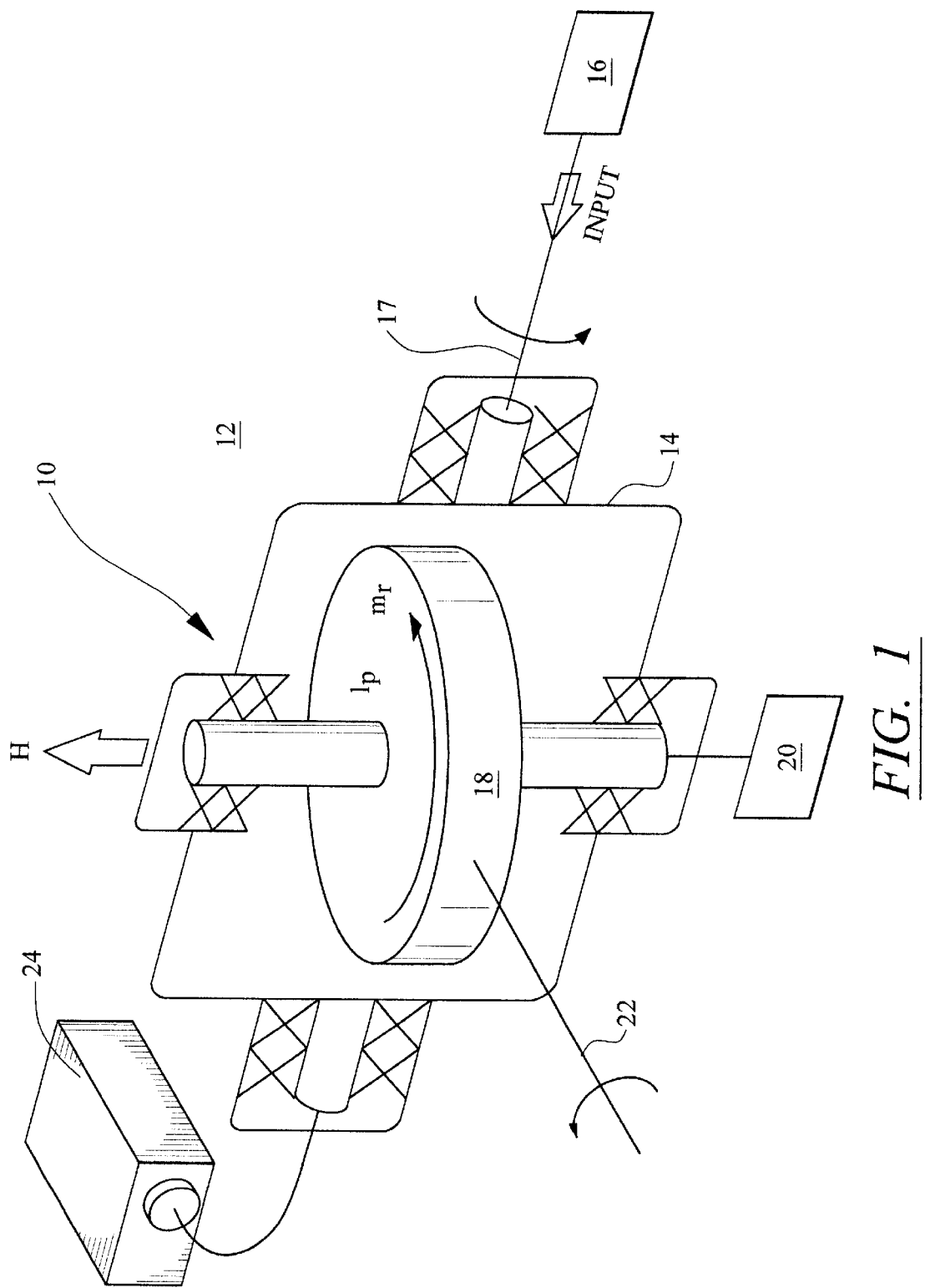
FIG. 1 is a schematic of one CMG that is used in the present invention.

Satellite torque control with an array of CMGs typically takes the following form (prior art), where these equations demonstrate a preferred method, among other possible methods, to determine the torque and rotor speed commands for the CMG gimbals and rotors:

Definitions $\vec{h} \equiv$ Vector representing CMG angular momentum $$A = \frac{\partial \vec{h}}{\partial \delta} \equiv \text{Jacobean of } CMG \text{ array angular momentum geometry}$$

$\delta \equiv$ CMG gimbal angle $\dot{\delta}_a \equiv$ Vector of actual CMG gimbal rates $\dot{\delta}_c \equiv$ Vector of commanded CMG gimbal rates $\dot{h}_a$ Actual torque applied to the spacecraft from the CMG array $\dot{h}_c \equiv$ Commanded torque to the CMG array The torque to a spacecraft from a CMG array is calculated by $$\dot{h}_a = A\dot{\delta}_a \qquad \text{Equation 1}$$

where the subscripts denote the actual values. In the physical satellite, the torque is the actual product of the physical motion (gimbal rate) of the angular momentum vector contained in the IGA including any disturbances. The actual gimbal rate is a function of the commanded gimbal rate and is affected by a variety of factors such as gimbal loop dynamics and the previously mentioned disturbances. This is represented here by a transfer function;

$$\dot{\delta}_c = f(\dot{\delta}_a) \qquad \text{Equation 2}$$

The commanded gimbal rates can be determined by a variety of methods, however the most efficient and most popular are variations of the Moore-Penrose pseudo-inverse;

$$\dot{\delta}_c = A^T(AA^T)^{-1}\dot{h}_c \qquad \text{Equation 3}$$

If we consider the disturbances in the CMG transfer function, $f(\dot{\delta}_a)$, to be represented at the CMG output axis by $\dot{h}_d \equiv$ Gimbal disturbance related output torque then the disturbance torque can be mitigated using this invention which is derived as follows;

A new Jacobean is generated that contains the geometry defining the output torque directions as well as the spin torque directions $$A^* = \left[ \frac{\partial \vec{h}}{\partial \delta} \quad \frac{\partial \vec{h}}{\partial \Omega} \right] = [A_{CMG} \; A_{RTR}] \qquad \text{Equation 4}$$

The Rotor Spin Motor commands for the respective IGAs are generated similarly to Equation 3 with the exception of using the rotor portion of the Jacobean $$\dot{\Omega}_c = A_{RTR}^T (A_{RTR} A_{RTR}^T)^{-1} \dot{h}_d \qquad \text{Equation 5}$$

As was the case as for the CMG, the spin motor loop dynamics influence the actual torque that the spin motors can produce.

$$\dot{\Omega}_a = f(\dot{\Omega}_c) \qquad \text{Equation 6}$$

and Equation 1 becomes $$\dot{h}_a = A^* \begin{bmatrix} \dot{\delta}_a \\ -\dot{\Omega}_a \end{bmatrix} \qquad \text{Equation 7}$$

which represents the torque from the array to the spacecraft from the precession of the stored angular momentum vector and the change in that vector due to using the spin motors to cancel the gimbal induced disturbances. The net torque from the array contains fewer disturbances and therefore is "smoother", or in other words has a higher torque quality.

The disturbance torque from the gimbal can be derived through a variety of methods that can include direct measurement, indirect measurement, and estimation or through an approximation such as a look-up table. A signal representing the disturbance torque is applied in Equation 5 to arrive as the RSM acceleration command, that is the signal to change the rotor speed to offset the disturbance torque.

Figure 2:
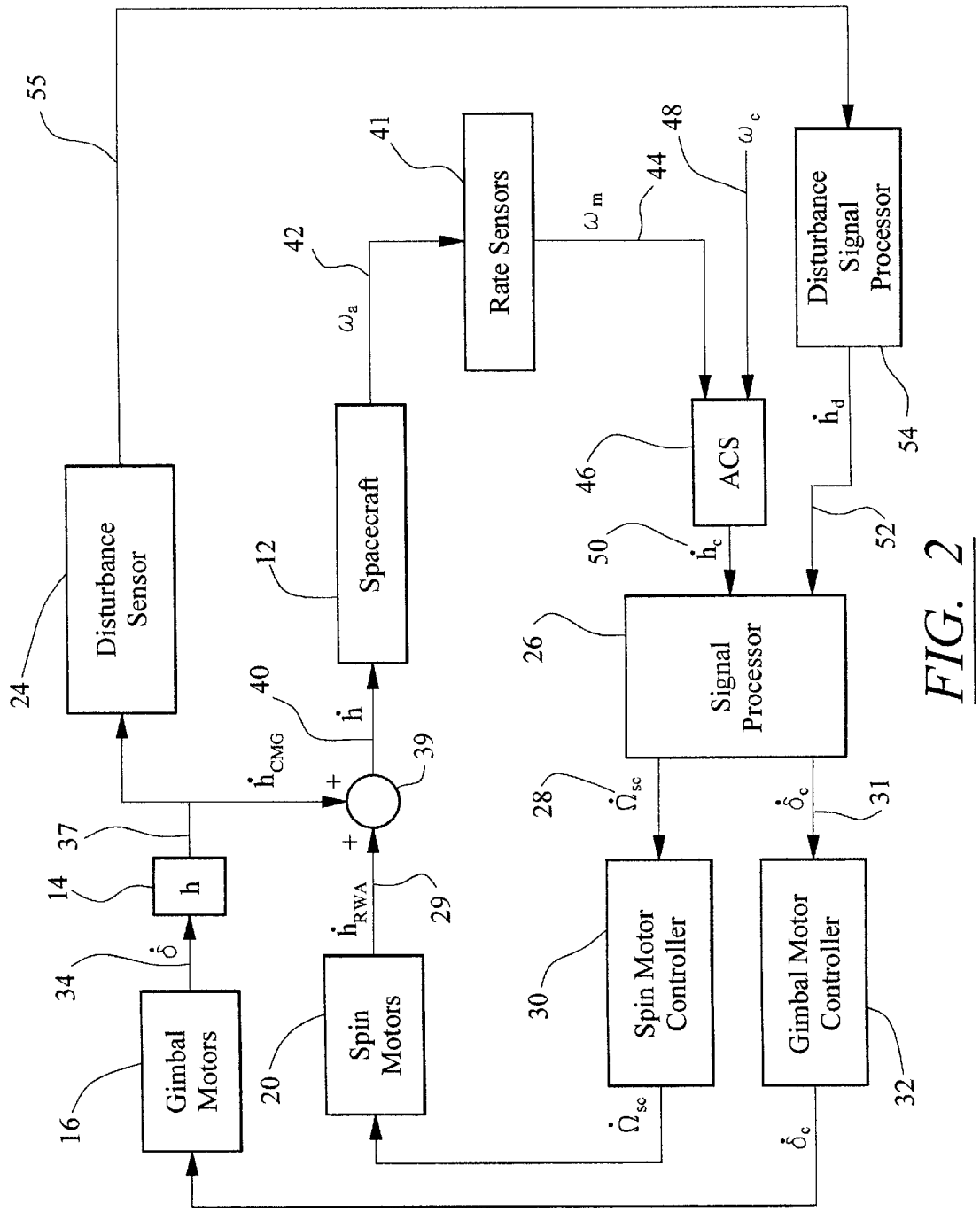
FIG. 2 is a functional block diagram of a CMG attitude control embodying the present invention.

For clarity and simplicity, in FIG. 2 mathematical terms for various rates and accelerations are shown in the drawing but identified below by reference numerals. The following discussion generally describes the control of one CMG 10, but it will be understood that it typically is used individually with a plurality of CMGs in an array, each CMG preferably having a system as shown in FIG. 2. In FIG. 2, a signal processor 26 provides signals 28, 31 respectively to rotor spin motor controller 30 and gimbal motor controller 32 of a CMG 10 (FIG. 1). The signal 28 controls the spin motor (RSM) control 20 to control the speed of rotor 18 producing angular momentum 29. With signal 30, the gimbal motor controller 32 moves the gimbal 14 with gimbal motor 16, producing the gimbal torque 37 on axis 22. The torque 37 is combined 39 with the rotor 18 torque, produced by the spin motor (RSM) 20. The resultant composite torque 40 is applied to rotate the spacecraft or satellite 12 around axis 22. Attitude rate sensors 41 detect the attitude change 42 to produce a measured rate 44 which is supplied to an attitude control system (ACS) 46 for the satellite (to control the three dimensional orientation of the satellite), which also receives a commanded attitude rate for the CMG. The ACS produces an attitude acceleration/deceleration 50 for the signal processor 26, which using known routines, changes the position of gimbal 14 so that, over time, the difference between the measured attitude 44 and command attitude 48 are the same.

Normally, the signal processor maintains a constant rotor spin rate 29, but according to the invention it receives a gimbal disturbance rate 52 from a disturbance signal processor 54, which responds to the output 55 from the disturbance sensor 24. The signal processor 54, which may be separate as shown or its function a program in signal processor 26, may compute the rate 52 in real time or use a look-up table or other technique. The signal processor 26 uses the rate 52 to produce a spin acceleration/deceleration 28, causing the spin motor controller to change the spin speed up or down in relation to the disturbance rate 52. This change slight increases/decreases the rate 40 to mitigate the effect of the disturbance.

Even though the invention has been described to mitigate the effects of gimbal disturbances, changing the rotor speed as explained can also be used to mitigate other disturbances or noise in an attitude control system. In addition to any modifications and variations described previously, one skilled in the art may be able to make modifications to invention and its components and functions, in whole or in part, without departing from its true scope and spirit.

What is claimed is:

1. An attitude control, comprising:

a control momentum gyro comprising an internal gimbal, a rotor on said internal gimbal, a motor for rotating said rotor, a motor speed control for said motor, means for moving said internal gimbal and an actuator control;

first signal processing means for providing a first signal to said motor speed control to change the speed of said motor in response to a disturbance mitigation signal and for providing a second signal to said means for moving said internal gimbal to change the attitude of a satellite in response to an attitude control signal;

a sensor for providing a gimbal motion signal manifesting the motion of said internal gimbal; and second signal processing means that receives said gimbal motion signal for detecting noise in said gimbal motion signal and for providing said disturbance mitigation signal to cause the rotor speed to change to reduce said noise in the motion of said internal gimbal.

2. A method for controlling a control momentum gyro having an internal gimbal and a rotor on said gimbal, comprising:

moving the internal gimbal; detecting noise from the operation of the control momentum gyro;

changing the speed of said rotor as a function of said noise to reduce the magnitude of said noise.

3. The method of claim 2 wherein in said noise is produced by said internal gimbal.

4. An attitude control, comprising:

a control momentum gyro comprising an internal gimbal, a rotor on said internal gimbal, a motor for rotating said rotor, a motor speed control for said motor, means for moving said internal gimbal, and an actuator control;

first signal processing means for providing a first signal to said motor speed control to change the speed of said motor in response to a disturbance mitigation signal and for providing a second signal to said means for moving said internal gimbal to change the attitude of a satellite in response to an attitude control signal;

a sensor for providing a signal that manifests noise in the control momentum gyro; and second signal processing means that receives said signal that manifests noise and for providing said disturbance mitigation signal to cause the rotor speed to change to reduce said noise.

5. The attitude control of claim 4, wherein said noise is produced by the motion of said internal gimbal.

* * * * *